United States Patent [19]

Wolford

[11] Patent Number: 4,593,443

[45] Date of Patent: Jun. 10, 1986

[54] TOOL FOR CRIMPING A CORNER BEAD PIECE OVER AN EXTERIOR PLASTERBOARD CORNER

[76] Inventor: Richard P. Wolford, 21 Kristin Pl., Apt. 1014, Schaumburg, Ill. 60195

[21] Appl. No.: 784,690

[22] Filed: Oct. 4, 1985

[51] Int. Cl.[4] .............................................. B23P 11/00

[52] U.S. Cl. ...................................... 29/243.5; 29/275

[58] Field of Search ............. 29/243.5, 243.56, 243.57, 29/243.58, 254, 275, 278; 72/325, 450

[56] References Cited

U.S. PATENT DOCUMENTS

| | | | |
|---|---|---|---|
| 969,471 | 9/1910 | Grossman | 29/243.57 |
| 2,178,187 | 10/1939 | Sake | 72/325 |
| 2,358,142 | 9/1944 | Carlin | 29/243.57 |
| 3,160,890 | 12/1964 | Lefebvre | 29/243.56 |
| 4,021,516 | 5/1977 | Stevenson | 269/41 |

*Primary Examiner*—Robert C. Watson
*Attorney, Agent, or Firm*—Charles F. Lind

[57] ABSTRACT

The disclosed crimping tool has two faces angled at a substantially right angle to one another across an interior corner, and a crimping pin is carried relative to each face operable to move from one position recessed behind the faces to another position projected forwardly beyond the faces. A post extends away from the corner rearwardly of the faces, and a striker is mounted to move on the post and is connected by linkage to the crimping pins. The tool fits with the faces over a corner bead piece, the piece itself being positioned over an exterior structural corner of meeting plasterboard sheets. The striker is adapted to be hit with a mallet or the like to drive the crimping pins from the recessed position to the projected position, and against the underlying corner bead piece and into the plasterboard, operable to crimp part of the corner bead piece into the plasterboard and secure it over the exterior plasterboard corner. The disclosed tool has magnet means carried on the tool faces, adapted to magnetically cooperate with and releasably hold the corner bead piece as positioned thereagainst. This allows one-hand manipulation of the tool and the corner bead piece as the corner bead piece is first being fitted over the exterior plasterboard corner and prior to crimping the piece with the tool.

11 Claims, 7 Drawing Figures

TOOL FOR CRIMPING A CORNER BEAD PIECE OVER AN EXTERIOR PLASTERBOARD CORNER

FIELD OF THE INVENTION

This invention relates to a crimping tool adapted to be positioned over a corner bead piece, itself covering the exposed edges of two sheets of plasterboard meeting at an exterior corner, and adapted to then be actuated to shift crimping pins against the corner bed piece to secure it over the exposed plasterboard corner.

BACKGROUND OF THE INVENTION

One form of construction of interior walls, partitions, soffits or the like, involves the use of structural framing covered on at least one side by sheets of plasterboard, or dry wall material, butted edge-to-edge. The plasterboard is generally manufactured in standard size sheets, such as four feet by eight feet, or four feet by ten feet, and may be ½, ⅝, or ¾ of an inch in thickness. The plasterboard sheets are cut in-the-field to size; and tape means and a plaster-composition may then be used over the butted joints of the plasterboard sheets, and sanded down to define a smooth finished surface.

For walls, partitions or soffits having two flat sheets of plasterboard meeting one another at an exterior corner, a metal "corner bead" piece is used to cover the exposed edges of the plasterboard sheets, or structural corner as such will hereinafter be termed in this disclosure, and to define a solid and true corner edge. The corner bead piece is somewhat L-shaped, having a pair of generally flat legs connected to one another across a slightly rounded exterior corner or bead. The legs are angled relative to one another at just slightly less than 90 degrees, to allow that the piece can be set tightly in place over the exterior structural corner, and have the exposed corner bead set straight and true. Nails may then be driven through holes in the legs of the corner bead piece, through the underlying plasterboard, and into the underlying framing, to secure the corner bead piece in place at, and over, the exterior structural corner.

The tape means and plaster-composition may then also be used over the corner bead piece up the the corner itself, again being sanded down to define smooth finished corner surfaces.

The corner bead pieces would be originally fabricated to a standard length, typically eight (8) or ten (10) feet in length. Consequently, any structural corner extended a distance in excess of this would require that several corner bead pieces be butted together, end-to-end, along the corner. To give a good overall appearance, the adjacent beads must line up along a reasonably straight and smooth edge. This may require that the installer be quite close to the anticipated joint, to visually and/or physically by touch, set the finished bead line. This final adjustment would be accomplished by proper shifting about of the corner bead piece, again by grasping the piece with a free hand.

For rapid high-output installation of the corner bead pieces, a crimping tool may be used, instead of nails. One form of crimping tool has an elongated frame comprising two faces angled at right angles across an interior corner. The corner of the tool is adapted to be positioned over the corner bead piece when the latter is itself in place over the exposed edges of the meeting plasterboard sheets, at the exterior structural corner. Crimping pins are pivoted to the frame, one relative to each face, and each pin has an end that in one position is recessed behind the face, but the pin can be shifted in another position whereat pin end projects forwardly of the tool face. A striker is mounted on the frame to move relative to, toward or away from, the tool faces; and the striker is connected by linkage to the crimping pins. The striker is adapted to be hit with a mallet or the like to shift the crimping pins, rapidly and with sufficient force, against the underlying corner bead piece, operable to crimp part of the corner bead piece into the plasterboard so as to secure the corner bead piece over the exterior structural corner.

In using the tool, the mallet is first tapped against the frame part of the tool to firm the corner bead piece against the underlying exterior structural corner, and is then smacked harder against the striker to produce the crimps in the corner bead piece. The tool can then be relaxed off of the corner bead piece, initially while yet holding the corner bead piece with the mallet hand, and moved axially along the corner bead piece some 6-10 inches, or the like, to set up again and make other crimps. After several crimps have been made, the corner bead piece will be sufficently held in place that one need not further hold the corner bead piece when shifting the tool between making additional crimps.

One major disadvantage of the discussed crimping tool is the difficulty in having one person simultaneously handle the separate corner bead piece, the tool, and the mallet, in lining up the corner bead piece properly before initially setting it in place. This task can be particularly slow, and unnerving, when stretching out to reach an overhead corner, and/or when working off a ladder or scaffold with any threatening factor of height or degree of sway and instability.

Thus, one might temporarily hold the mallet in one's tool-carrying belt loop or pinched between one's legs, or may set the mallet down on some adjacent ledge or the like. The tool and the corner bead piece may then be held and manipulated by two free hands; first to position the corner bead piece over the exterior structural corner with the one end lined up properly to butt against the wall, floor or ceiling extended transverse to the structural corner or edge-to-edge with the adjacent secured corner piece, and then to position the tool over the corner bead piece. The corner bead piece is now trapped and held in place by the tool itself. Consequently, the hand originally holding the corner bead piece is now free and can be used to pick up the mallet, and to hit the tool to set and secure the corner bead piece.

OBJECTS OF THE INVENTION

A basic object of the present invention is to provide an improved crimping tool that will be easy, and safe, for one person to use in initially positioning and locating a corner bead piece over the exposed exterior structural plasterboard corner, and the tool over the corner bead piece and structural corner, without requiring the person to set the mallet or the like down during this sequence.

A more specific object of this invention is to provide an improved crimping tool that allows the temporary and releasable sercurement of the corner bead piece to the tool, to allow then one-hand manipulation of the joined corner bead piece and tool to the structural corner, to initiate and complete with one hand the proper location of both the corner bead piece and tool over the structural corner, all prior to setting the first crimps that hold the corner bead piece to the structural corner.

SUMMARY OF THE INVENTION

To achieve these and other objects, the present invention may provide a crimping tool having cooperating faces against which the separate corner bead piece is to be positioned, and magnet means secured to and carried on the tool at the faces, operable to adhere to the corner bead piece and hold the corner bead piece firmly, but releasibly, as positioned in place on the tool faces.

BRIEF DISCRIPTION OF THE DRAWINGS

Further objects, advantages and features of the present invention will appear and become apparent from the following disclosure and description, including as a part thereof the accompanying drawings, in which.

Figures 1, 2, 3, 4, 5, 6, 7:
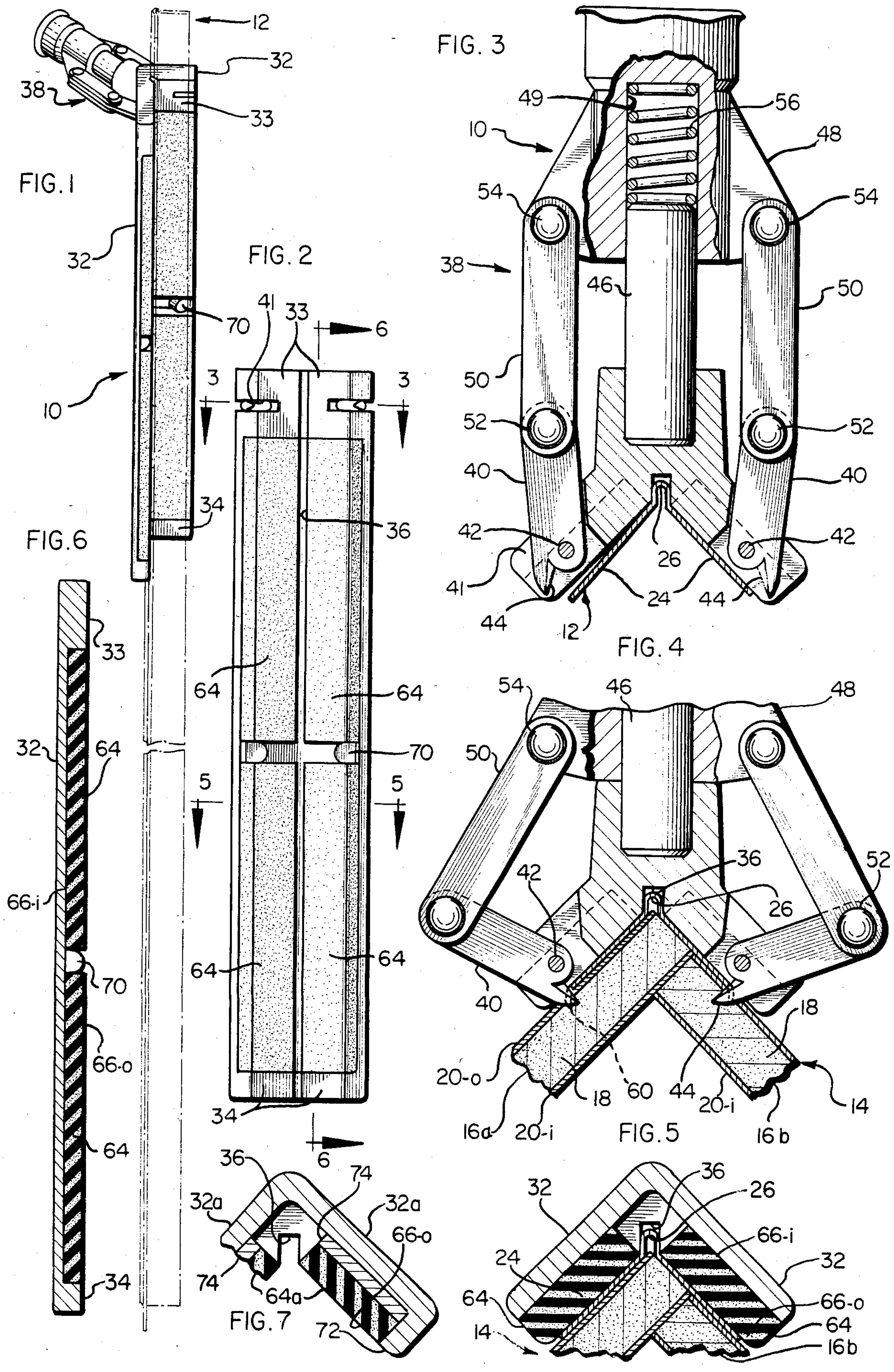
FIG. 1 is a perspective view of the tool and corner bead piece held thereto, illustrating the allowed one-hand manipulation of these components to bring them to, and to locate them in place over, an exposed exterior structural corner.
FIG. 2 is an elevational view, slightly enlarged compared to the scale used in FIG. 1, of the angled faces of the tool.
FIG. 3 is a fragmentary sectional view, taken generally along line 3—3 in FIG. 2 and slightly enlarged compared to the scale used in FIG. 2, showing the tool in a transit operative position with the corner bead piece in place on the tool.
FIG. 4 is a fragmentary sectional view, similar to FIG. 3, except showing the tool in a crimping operative position relative to the underlying corner bead piece and an exterior structural corner.

FIGS. 5 and 6 are fragmentary sectional views, taken generally along lines 5—5 and 6—6 in FIG. 2, showing the tool face and the association of magnet means therein; and FIG. 7 is a fragmentary sectional views, similar to FIG. 5, except showing an alternate association of tool face and magnet means therein.

DESCRIPTION OF A PREFERRED EMBODIMENT OF THE INVENTION

FIG. 1 illustrates a crimping tool 10 of the type to be disclosed herein, shown with a corner bead piece 12 (illustrated in phantom) stably supported, according to this invention, on the tool to allow one-hand manipulation of these components in locating the piece 12 in place over an exterior structural corner 14 (see FIGS. 4 and 5). The structural corner 14 typically would be formed by two flat plasterboard sheets 16*a* and 16*b* meeting at 90 degrees, or right angles, relative to one another. The illustrated conventional plasterboard sheet 16*a* or 16*b* has an inner core 18 of hardened gypsum plaster sandwiched between laminates 20-i and 20-o of fiberboard, paper, felt or the like bonded or otherwise secured thereto.

The corner bead piece 12 may be of an L-shape in cross-section, formed by a pair of legs 24 connected together across an intermediate rounded corner bead 26. The legs 24 typically would be angled at just less than 90 degrees from one another (see FIG. 3), to allow them to be flexed over the exterior structural corner 14, which as noted is generally a right angle corner. As flexed in place, the legs 24 may lie somewhat flush against the outer laminates 20-o, and the bead 26 may be near, but outwardly spaced from, the intersection of these surfaces.

The crimping tool 10 is also somewhat L-shaped, having a unitary frame with two angled arms 32, and having generally flat pads 33 and 34, at the opposite ends of the arms, angled at approximately 90 degrees, or a right angle, from one another across a defined interior corner. A cutout or recess 36 is defined near where the pads 33 and 34 would intersect, to provide clearance space to receive the bead 26 of the corner bead piece 12, when the corner bead piece is in place on the tool (see FIGS. 3 and 4), with the legs 24 against the pads. The crimping tool 10 may be between 10 and 15 inches in length.

Crimping means 38 are provided on the tool 10, located adjacent the pad 33 end of the tool. The crimping means 38 illustrated has a pair of crimping pins 40, each located in a slot 41 formed in the arm 32 and pivoted about a shaft 42 relative to each arm. A free die end 44 of each crimping pin, in one relative position of the pin (see FIG. 3), lies beneath the tool pad 33; while in another position of the pin (see FIG. 4), projects outwardly beyond the tool pad. A post 46 extends in a direction rearwardly away from the tool pads 33, from in line approximately through their intersection and angled 45 degrees from each. A striker 48, having a bore 49 fitted over the post 46, is adapted to ride back and forth on the post 46. A pair of links 50 connected between the striker 48 and crimping pins 40, as by shafts 52 and 54 at the pin and striker respectively, tie the movement of the striker 48 to associated movements of the pins 40. Spring means 56 located in the bore 49 between the post 46 and the striker 48 operate to bias the striker normally to the withdrawn or corner bead piece transit position illustrated in FIG. 3.

Each corner bead piece 12 may be of a standard size, with each leg 24 extending perhaps $1\frac{1}{4}$ and $1\frac{1}{8}$ inches away from the bead 26, on the outside and inside, respectively, of the corner bead piece. Each tool pad 33 and 34 may extend, in the direction away from the relieved corner 36, a distance of the order of $1\frac{1}{4}$ inches from the corner, so as to overlie and completely cover the corresponding leg 24 of the corner bead piece. The die ends 44 of the crimping pins 40 are located to move forwardly of the tool pads 33 just beyond the outer end edges of the legs 24, and then against the leg edges and moreover into the underlying corner structure 14.

Movement of the striker 48 inwardly along the post 46 causes the crimping pins 40 to shift from the transit position (see FIG. 3) with the die ends 44 recessed beneath the plane of the tool pads 33 to the crimping position (see FIG. 4) with the die ends 44 projected outwardly beyond the tool pads 33. This causes the die ends 44 to move against the underlying corner bead piece 12 and into the underlying wall structure, crossing over the end edges of the legs 44 to rupture and/or deform part of the legs and to crimp the deformed parts, as a tab-like configuration 60 (see FIG. 4), into the underlying corner structure. This draws the corner bead piece 12 tightly against, and also mechanically holds it to, the underlying corner structure 14.

It is intended that the striker 48 be actuated by a relatively rapid and heavy impact blow, such as delivered by a large rubber mallet or the like (not shown) hitting the striker.

The disclosed crimping tool 10 moreover provides magnet means 64 in the tool arms 32. The magnet means 64 may be in the form of a ferromagnetic material, such as barium ferrite crystals, blended into a rubber or vinyl binder, and thus be in flat flexible pieces. Each resultant magnet piece 64 may have the opposite flat faces 66-i and 66-o of opposite magnetic North and South polarity of a permanent magnet. The magnet pieces 64 may be secured by bonding (or by screws, not shown) relative to the tool arms. The exterior faces 66-o of the magnet means 64 are aligned or coplanar with the respective exterior pads 33 and 34 of the crimping tool 10, and thus together define angled tool faces against which the legs 24 of the corner bead piece may seat.

One form of tool construction may provide that small bosses 70 (see FIGS. 1, 2 and 6), the result generally of the casting fabrication of the tool frame, are on the tool arms 32 between the spaced pads 33 and 34, and thus interrupt the smooth even contour of each defined recess between the spaced pads 33 and 34. As such, the magnet means 64 may be formed of several pieces fitted between the respective pads 33 or 34, and the bosses 70. Alternatively, the bosses may be ground down and removed, or the tool frame may be fabricated by other means than casting so that no bosses exist in the first place; whereupon the magnet means 64 may extend as a single piece (not shown) between the spaced pads 33 and 34 of each tool arm 32.

In the tool illustrated in FIGS. 1–6, the magnet means 64 extend from proximate, but spaced from, the recessed or relieved corner 36 (to allow clearance space for the bead 26 of the corner bead piece), almost out to the edges of the arms (see FIG. 5). An alternate construction may provide that the frame arm 32*a* has a narrow pad 72, formed to extend continuously along the edge of each tool arm (as illustrated in FIG. 7), the pad 72 being coplanar with the other pads (not shown, but corresponding to pads 33 and 34). The magnet means 64*a* may be received in the recess defined in the arm 32*a* within the pad areas, and may also have its exterior surface 64*a*-o coplanar with the pad areas (33 and 34) and 72. The pads 72 may provide added protection against wear or damage of the magnet means 64*a*, particularily at the edges.

Each of the magnet means 64 (or 64*a*) may be formed to a thickness to extend between the adjacent face of the arm and tne coplanar exterior plane of the pads; or may be formed of thinner pieces and a spacer 74 (see FIG. 7) may be used under tne magnet piece 64*a* to make the exterior face 66*a*-o of the magnet line up coplanar with the pad faces. In either embodiment, the magnet means 64, and/or magnet means 64*a* and spacer 74 provide solid support between the arms, between the pads, when butted against the corner bead piece and the corner structure 14. This gives a very solid feel to the "hit" with the mallet, when tapping the tool to set the corner bead piece firmly in place over the corner structure 14; or when smacking the tool striker hard during the actual crimping. In this regard, as the crimping pins, and the linkage between the striker and the crimping pins, are somewhat aligned along a straight line in the position of FIG. 3, a large part of the mallet impact force merely generates reaction forces against the tool, and the tool must be manually pushed against the corner structure to resist being "kicked" away from the corner structure. The solid magnet and/or solid magnet and spacer reduce bounce-back of the tool, and thus the hold-down forces needed.

The corner bead piece 12, being of a magnetic steel material, will thus be magnetically attracted to and will adhere to the magnet means 64 when it is positioned in place against the magnet means and the tool faces. As the legs 24 of the corner bead piece 12 are angled from one another at less than 90 degrees, and the tool pads and/or faces are angled almost at right angles from one another, it may be possible that only one of the legs may contact and be held by the magnet means of the tool. A typical corner bead piece is of light gauge steel material, to weigh only several pounds, for a 10 foot length. The magnet means 64 in each tool face thus should be sufficient to hold this weight.

As each magnet means has a large effective surface area to contact the corner bead piece positioned thereagainst, extending almost the full length and width of the tool face, the magnetic flux density need not be high while providing a sufficient holding force to retain the corner bead piece in place against the tool face. The light density magnetic force moreover will allow the user to intentionally separate the tool 10 from the retained corner piece 12, merely by lifting one end of the tool relative to the other to overload and break that end at the magnetic connection from the corner bead piece, which virtually will free the tool from the corner bead piece.

The tool frame may typically be formed of a non-magnetic material, such as an alloy of zinc or aluminum, and may be die-cast; while the crimping means 38 may be formed of steel or other magnetic material. The spacer 74 may be made of a magnetic material, such as steel, which when disposed against the inner face of the magnet 64*a* may tend to concentrate the magnetic force at the exterior magnet face 66*a*-o.

SUMMARY OF THE OPERATION

The disclosed crimping tool 10 may be easily loaded by a person, with one hand holding the tool 10 and with the other hand holding both the corner bead piece 12 and the mallet (not shown), to place the corner bead piece in magnetic association with the tool faces. The combined tool and corner bead piece, now carried on the tool, may then be manipulated with the one hand to line up the corner bead piece 12 properly over the corner structure 14, edge-to-edge with the adjacent secured corner piece or butted against the adjacent transverse wall (neither being shown). This all can take place easily, quickly and safely before setting the corner bead piece securely in place, allowing the person to more comfortably, and confidently, stretch out to reach an overhead corner, and/or to work off a ladder or scaffold (ever with a threatening degree of sway and instability). The mallet (not shown) may be held in the other hand during this initial positioning of the corner bead piece in place against the exterior structural corner, and thus is ready to hit against the tool striker 48 to set the crimps 60, without removing it from one's belt loop or from between carefully and tightly pinched legs, or on picking it up from some adjacent ledge. The mallet may be used first to tap the tool and firm the corner bead piece against the underlying exterior structural corner, and then to smack the striker hard to crimp the corner bead piece. The tool 10 can then be pulled off of the corner bead piece 12, and moved axially along the corner bead piece some 6–10 inches, or the like, to set up again and make other crimps.

What I claim is:

1. A tool for crimping a corner bead piece to an underlying exterior structural corner, comprising the combination of two elongated arms defining spaced pads angled at a substantially right angle to one another across an interior corner, a crimping pin carried relative to each arm, operable in one position to lie recessed behind a respective pad and in another position to have a die end project outwardly beyond the same pad, means including a striker, and linkage connecting the striker to the crimping pins operable to tie the movement of the striker to associated movements of the crimping pins, said striker being adapted to be hit with a mallet or the like to drive the crimping pins against an underlying corner bead piece and into the corner structure, to crimp parts of the corner bead piece into the corner structure to secure the corner bead piece thereto, and magnet means carried on the tool and having outer faces that are substantially coplanar with the respective tool pads, said magnet means being adapted to cooperate flush with one part of the corner bead piece and hold the corner bead piece as positioned in place on the tool, operable to allow the one-hand manipulation of the tool and corner bead piece as the corner bead piece is first being positioned over the exterior structural corner and prior to crimping with the tool.

2. A crimping tool for a corner bead piece, according to claim 1, wherein said magnet means is in the form of a ferromagnetic material blended into a rubber or vinyl binder and each magnet piece having a flat face of magnetic North and/or South polarity of a permanent magnet, and said flat face and outer face of the magnet means being the same and being coplanar with the tool pads.

3. A crimping tool for a corner bead piece, according to claim 2, further wherein the magnet means is secured by bonding relative to the tool face.

4. A crimping tool for a corner bead piece, according to claim 1, further wherein each magnet means is formed to a thickness to extend between the adjacent face of the tool arm and the coplanar exterior plane of the tool pads, operable to provide a solid feel and support between the arms when butted against the corner bead piece and the corner structure.

5. A crimping tool for a corner bead piece, according to claim 1, further including spacer means disposed adjacent the inner face of the magnet means, and wherein the spacer and magnet means together are formed to a thickness to extend between the adjacent face of the tool arm and to present the outer face of the magnet means coplanar with the tool pads, operable to provide a solid feel and support between the arms when butted against the underlying corner bead piece and the corner structure.

6. A crimping tool for a corner bead piece, according to claim 5, further wherein the spacer means is formed of a magnetic material, operable to concentrate the magnetic force at the outer face of the magnet means.

7. A crimping tool for a corner bead piece, according to claim 1, further including a narrow pad formed to extend continuously along the edge of each tool arm, the pad being coplanar with tne other pads, and the magnet means being received in a recess defined in the arm by the pads.

8. A tool for crimping a corner bead piece to an underlying exterior structural corner, comprising the combination of a frame having two elongated arms each defining a pair of spaced generally coplanar pads, each pair of pads being angled at a substantially right angle to one another across an interior corner, a crimping pin carried relative to each arm, operable in one position to lie recessed behind a respective pad and in another position to have a die end project outwardly beyond the same pad, means including a striker, and linkage connecting the striker to the crimping pins operable to tie the movement of the striker to associated movements of the crimping pins, said striker being adapted to be hit with a mallet or the like to drive the crimping pins against an underlying corner bead piece and into the corner structure, to crimp parts of the corner bead piece into the corner structure to secure the corner bead piece thereto, said frame being formed of a non-magnetic material, magnet means carried on and secured to the tool arms, in a recess defined on each arm between the respective pairs of pads, each of said magnet means being in the form of an elongated element having opposite flat surfaces of magnetic North and/or South polarity, each element of said magnet means being disposed with one of the surfaces close to a face of the arm within the recess and offset from a plane defined by the respective coplanar tool pads of each arm, and with the other of the surfaces substantially coplanar with the respective tool pads of each arm, said magnet means being effective upon the corner bead piece being positioned thereagainst to magnetically hold the corner bead piece as positioned relative to the tool, operable thereupon to allow one-hand manipulation of the tool and the held corner bead piece, in order to locate the corner bead piece over the exterior structural corner, prior to crimping with the tool.

9. A crimping tool for a corner bead piece, according to claim 8, further wherein each elongated element of the magnet means is formed to a thickness to extend between said adjacent face of the tool arm and the plane defined by the tool pads, operable to provide a solid feel and support between the arms when butted against the corner bead piece and the corner structure.

10. A crimping tool for a corner bead piece, according to claim 8, further including spacer means disposed between the adjacent face of the arm and the one surface of each element of the magnet means, and wherein the spacer and magnet means element together are formed to a thickness to extend between the adjacent face of the tool arm and to maintain the other outer surface of the magnet means coplanar with the tool pads, operable to provide a solid feel and support between the arms when butted against the underlying corner bead piece and the corner structure.

11. A crimping tool for a corner bead piece, according to claim 10, further wherein the spacer means is formed of a magnetic material, operable to concentrate the magnetic force at the outer face of the magnet means.

* * * * *